(12) United States Patent
Kondo et al.

(10) Patent No.: US 6,409,366 B1
(45) Date of Patent: Jun. 25, 2002

(54) LIGHTING DEVICE FOR A MOTORCYCLE

(75) Inventors: Tetsuya Kondo; Takao Yamamoto, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/448,305

(22) Filed: Nov. 24, 1999

(30) Foreign Application Priority Data

Nov. 27, 1998 (JP) .......................................... 10-336903

(51) Int. Cl.⁷ .................................................. B62J 6/00

(52) U.S. Cl. ........................ 362/473; 362/548; 362/549; 362/432; 362/370

(58) Field of Search ................................. 362/473, 496, 362/546, 548, 549, 368, 370, 432; 340/475

(56) References Cited

U.S. PATENT DOCUMENTS

| | | | | |
|---|---|---|---|---|
| 1,646,807 A | * | 10/1927 | Benjamin | 362/432 |
| 3,094,220 A | * | 6/1963 | Harling | 362/432 |
| 3,950,727 A | * | 4/1976 | Smith | 362/473 |
| 5,655,833 A | * | 8/1997 | Raczynski | 362/432 |
| 5,820,254 A | * | 10/1998 | Duenas | 362/473 |

FOREIGN PATENT DOCUMENTS

JP   2121115   6/1989

\* cited by examiner

*Primary Examiner*—Thomas M. Sember
(74) *Attorney, Agent, or Firm*—Birch, Stewart, Kolasch & Birch, LLP (57) ABSTRACT

A bulb container for a vehicle having a stay for securing the bulb container to the vehicle body. The stay has a peripheral groove which is engaged with a mounting hole in the vehicle body. A fixing member 24 can be included for reinforcing the portion of the stay which is inserted into the vehicle body.

11 Claims, 8 Drawing Sheets

LIGHTING DEVICE FOR A MOTORCYCLE

BACKGROUND OF THE INVENTION

1. Field of the Invention

The present invention relates to a lighting device for a motorcycle having improved workability in mounting to a vehicle body.

2. Background Art

Figure 12:
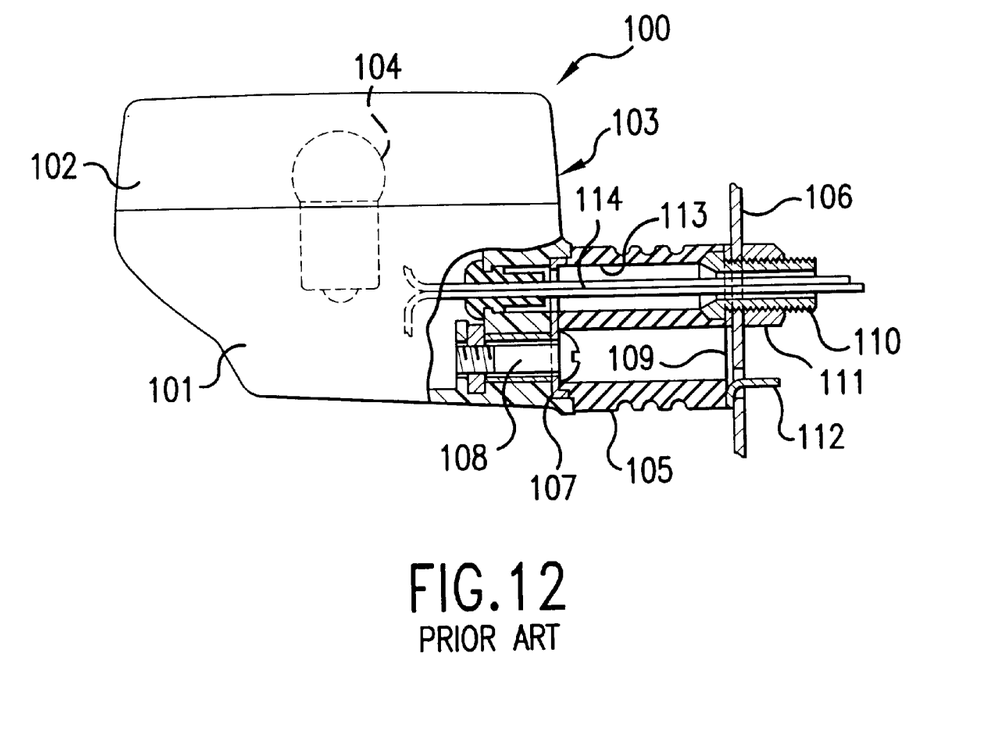
FIG. 12 is a sectional view of a first conventional direction indicator.

FIG. 12 of the present application is a sectional view of a conventional direction indicator for a motorcycle. The direction indicator 100 has an electric bulb 104 contained in a bulb container 103 composed of a base 101, and a front lens 102 serving as a cover. The direction indicator 100 is mounted to a vehicular body 106 via a stay 105 connected to the base 101. A mounting plate 107 mounted to one end of the stay 105 is fixed to the base 101 with a bolt 108, and a mounting plate 109 mounted to the other end of the stay 105 is fixed to the vehicular body 106 with a bolt 110 and a nut 111. A claw 112 functioning as a rotation stop member is formed on the mounting plate 109. The bolt 110 is integrally formed within the stay 105, and has a through hole formed coaxially with a hole 113 formed in the stay 105. A power feeding cord 114, which is connected to the electric bulb 104, is guided to the vehicular body 106 side via the through-hole formed in the bolt 110. A direction indicator having such a structure is disclosed in Japanese Utility Model Publication No. Hei 1-21115.

Figure 13:
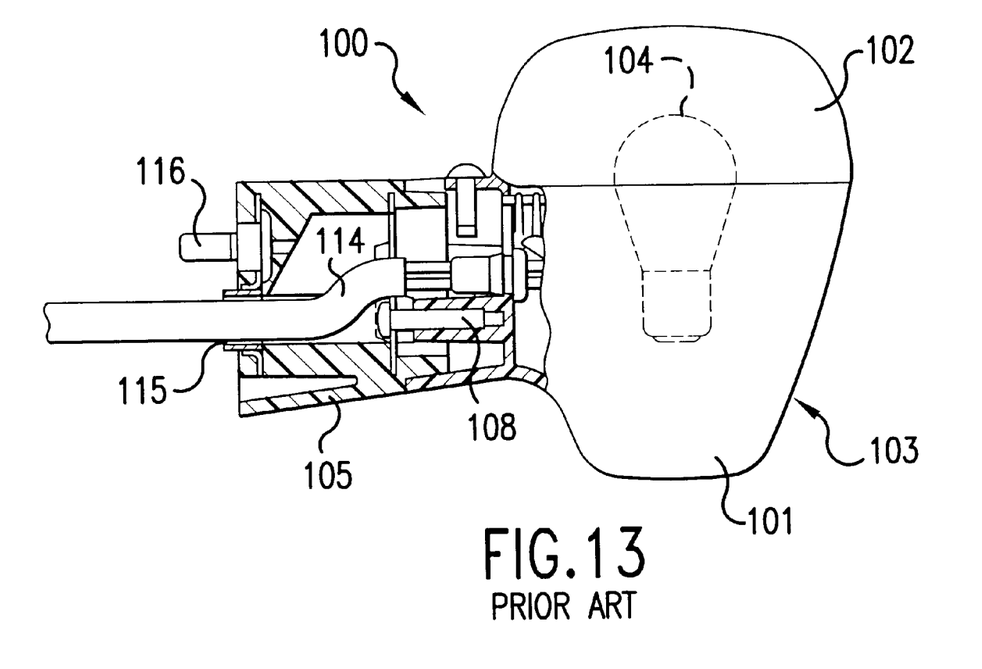
FIG. 13 is a sectional view of a second conventional direction indicator.

FIG. 13 is a sectional view of another example of a conventional direction indicator. In this figure, parts corresponding to those shown in FIG. 12 are designated by like reference numerals. A direction indicator 100 is configured such that a hole 115 used for fastening a bolt 108 provided for fixing a stay 105 to a base 101 is formed in a side end portion of the stay 105. The hole 115 serves as a passage for guiding a cord 114 to the vehicular body 106 side. In this way, the conventional art example shown in FIG. 13 is different from the conventional art example shown in FIG. 12, in that a hole for guiding the cord 114 is not formed in a bolt 116.

The above-described conventional direction indicators have the following shortcomings: In each direction indicator, since the stay 105 must be molded so that the bolt 110 or 116 is integrally formed within the stay, the molding of the stay 105 is complicated. In general, a connector for connecting two cord portions on the electric bulb side to two cord portions on the vehicular body side is provided at the leading end of the cord 114.

If a connection part (coupler connector) is used to unify the two cord portions, a large hole for allowing the coupler connector to pass through must be formed in the bolt 110, and the sizes of the bolt 110 and the nut 111 must be increased. Also since the nut 111 must be fastened to the bolt 110 such that the cord 114 has passed through the bolt 110, it is difficult to use an automatic fastening apparatus to hold the entire nut 111. This is disadvantageous in that the nut 111 must therefore be manually fastened to the bolt 110.

In the example of FIG. 13 in which the bolt 108 is passed through the hole 115, to advance the bolt 108, a screwdriver must be inserted in the hole 115 such that the cord 114 is offset to one side. This decreases the ease of installation of the bolt.

Further, in the example of FIG. 13, since the stay 105 is fixed to the vehicular body 106 by a relatively small bolt 116, excess stress is concentrated at the mounting portion of the bolt 116. This limitation restricts the degree of freedom in design of the stay. If the vehicular body is formed from a resin material, it is difficult to securely fasten the stay 105 to the vehicular body 106 with the bolt 116.

SUMMARY OF THE INVENTION

An object of the present invention is to overcome the shortcomings of the conventional art and to achieve other advantages not contemplated by the conventional art.

The present invention is in part addressed to a lighting apparatus for a motorcycle which has a simplified structure for the stay, thereby improving the workability in molding and assembling the apparatus, and also reducing design restrictions.

The present invention provides a lighting device for a motorcycle having a bulb container and a stay for fixing the bulb container to a mounting member of a vehicle body. The stay is formed into a cylindrical shape having a through-hole, and has an engagement groove engaged with a bulb container mounting hole provided in the mounting member. The engagement groove is formed in the outer periphery of the stay at a position on the mounting member mounting side. The stay includes a fixing member having at least a cylindrical portion to be fitted in an opening of the stay at an end portion on the mounting member mounting side.

Because the bulb container is supported by the stay engaged with the mounting member on the vehicle body side, and the cylindrical portion of the fixing member is fitted in the hole of the cylindrical stay, the engagement portion between the mounting member and the stay can be reinforced.

The present invention also provides a flange formed on the cylindrical portion of the fixing member, and an engagement hole in at least one of the cylindrical portion and the flange. A projection to be engaged in the engagement hole is provided on the stay. According to this feature, since engagement of the projection and the engagement hole prevents the fixing member from slipping off of the stay, it is possible to more securely fix the bulb container to the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not imitative of the present invention, and wherein.

DETAILED DESCRIPTION OF THE PREFERRED EMBODIMENTS

Figure 9:
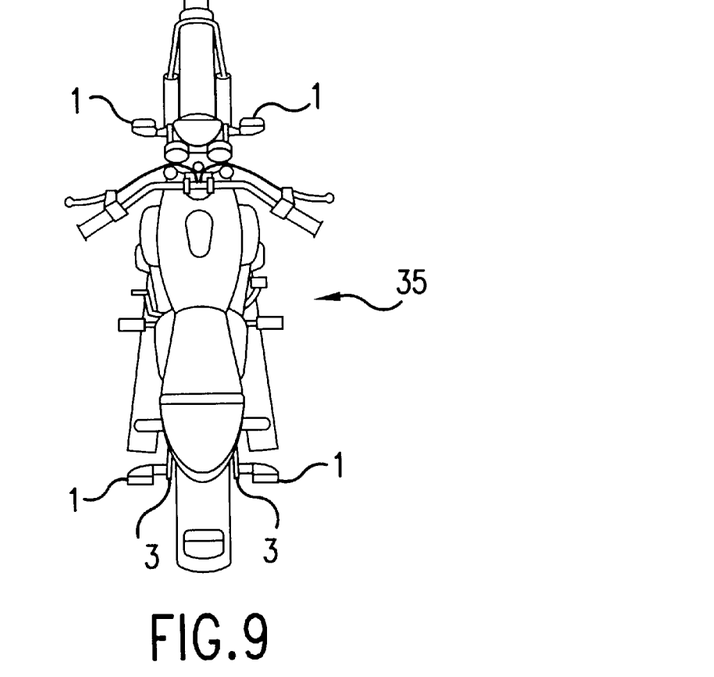
FIG. 9 is a top view of a motorcycle according to the present invention.
Figure 10:
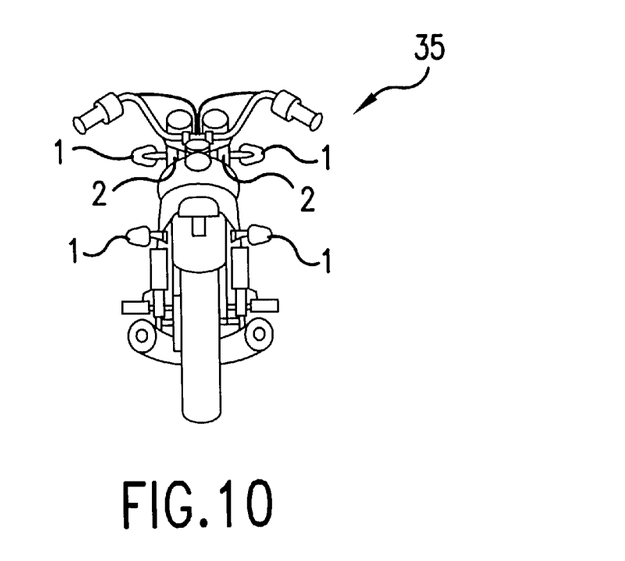
FIG. 10 is a rear view of a motorcycle according to the present invention.

FIG. 9 is a plan view showing a motorcycle 35 having a lighting device according to an embodiment of the present invention, and FIG. 10 is a rear view of the motorcycle shown in FIG. 9. In FIGS. 9 and 10, a pair of right and left direction indicators 1 are provided on each of the front and rear portions of a motorcycle 35. The direction indicators 1 at the front portion of the vehicle body are mounted on a front fork 2 via brackets (not shown) or the like, and the direction indicators 1 at the rear portion of the vehicle body are mounted on brackets 3 provided on a rear frame (not shown) so as to project rearwardly therefrom. It should be noted that the mounting position of the direction indicators 1 is not limited to that described above. For example, the direction indicators 1 can be mounted to a fairing or a cowl at the front portion of the vehicle body, at a rear fender, or the like.

Figure 1:
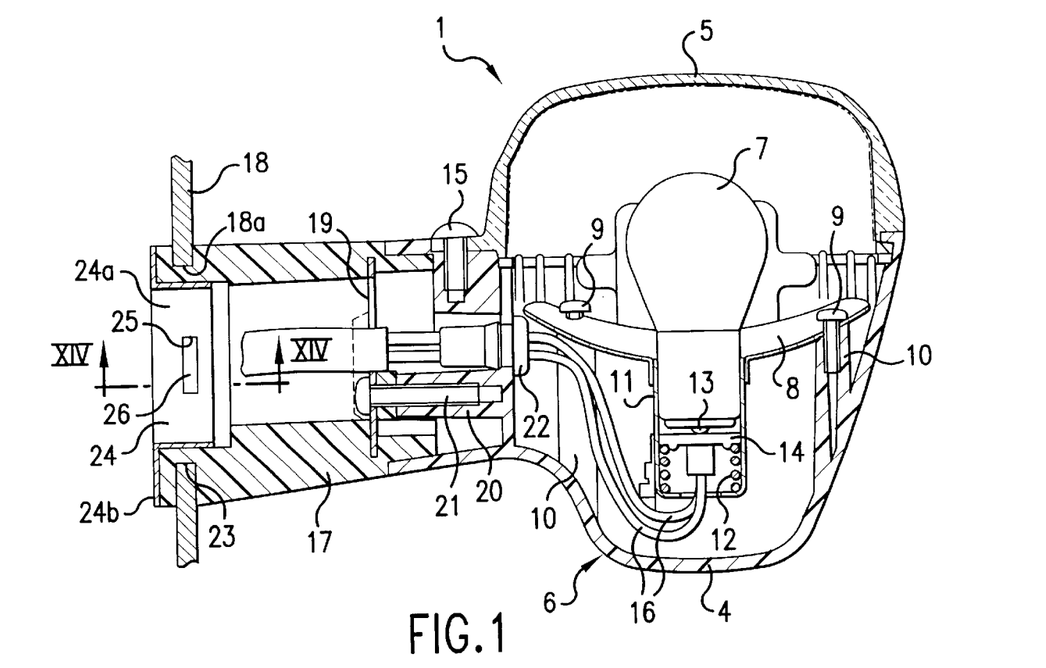
FIG. 1 is a sectional view of a direction indicator according to an embodiment of the present invention.

FIG. 1 is a sectional view of the direction indicator 1. The direction indicator 1 has an electric bulb 7 contained in a bulb container 6 composed of a base 4 and a front lens 5 serving as a cover. A reflector 8 for forwardly reflecting light emitted from the electric bulb 7 is fixed to a boss 10 of the base 4 with lock screws 9. A socket 11 for holding the electric bulb 7 is provided at a central portion of the reflector 8. A compression coil spring 12 is disposed on the bottom of the socket 11 for elastically biasing a contact 14 to a terminal 13 at the rear end of the electric bulb 7 inserted in the socket 11. The lens 5 is fixed to the base 4 with a lock screw 15. A cord 16 is connected to the contact 14.

The bulb container 6 is held by a mounting member constituting part of the vehicle body. The mounting member is a generally flat portion of the vehicle body 18 which receives a portion of a stay 17. The stay 17 has a generally cylindrical shape. One end of the stay 17 has a reduced diameter which is fitted into the opening of the base 4. A mounting plate 19 is fixed within the stay 17 at a position near the bulb container 6 side. The mounting plate 19 is fixed to a boss 20 formed on the base 4 with a lock screw 21, so that the stay 17 is connected to the bulb container 6. The cords 16 are led to the vehicle body 18 side by way of a bush 22 fixedly engaged in a groove of the base 4 and a hollowed portion of the stay 17.

The stay 17 is fixed to the vehicle body 18 by engaging a groove 23 formed along the outer periphery of the stay 17 with a bulb container mounting hole 18a formed in the vehicle body 18. The stay 17 is preferably made from an elastic material such as rubber which is easily inserted into the hole 18a of the vehicle body 18, and which absorbs vibration and impact loads.

While the stay 17 is fixed to the vehicle body 18 by engaging the groove 23 with the hole 18a as described above, it is preferably provided with a reinforcing means for withstanding a strong external force. In this embodiment, the reinforcing means is configured as a fixing member 24. The fixing member 24 is located within the stay 17 and prevents deformation of the end portion of the stay 17.

The fixing member 24 has a cylindrical portion 24a and a flange 24b projecting radially from the cylindrical portion 24a. A shrink range between the cylindrical portion 24a and the inner surface of the stay 17 may be set such that the outer peripheral surface of the cylindrical portion 24a inserted in the stay 17 presses the inner surface of the stay 17 to compress a portion of the stay 17 held between the hole 18a of the vehicle body 18 and the outer peripheral surface of the cylindrical portion 24a. In this configuration, the outer peripheral surface of the fixing member 24 is in tight contact with the inner surface of the stay 17, and the hole 18a of the vehicle body 18 is in tight contact with the groove 23 of the stay 17. This configuration ensures secure attachment of the stay 17 with the vehicle body 18.

Figure 14:
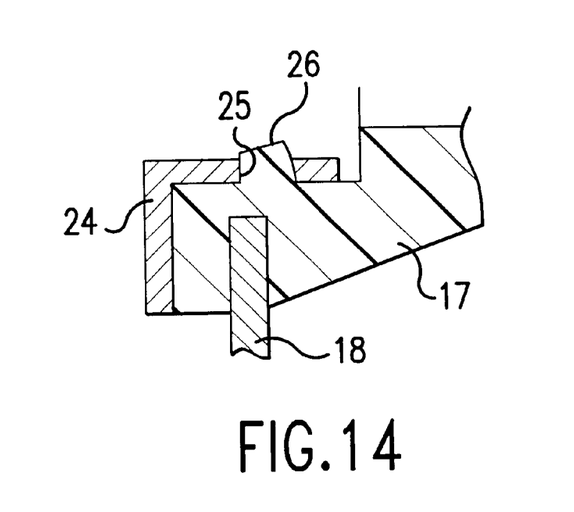
FIG. 14 is a view seen from line XIV—XIV of FIG. 1.

A rectangular hole 25 is formed in the cylindrical portion 24a and a projection 26 is formed on the inner surface of the stay 17. The projection 26 is engaged in the hole 25 to prevent the slip-off of the fixing member 24 from the stay 17 (see FIG. 14). The projection 26 and the engagement hole 25 are not required if the fixing member 24 can be secured to the stay 17 by a secure shrink-fit.

The flange 24b is formed to withstand a strong external force applied to forcibly separate the stay 17 from the vehicle body 18. In ordinary use, the stay 17 can be sufficiently secured to the vehicle body 18 even if the flange 24b is omitted.

Figure 2:
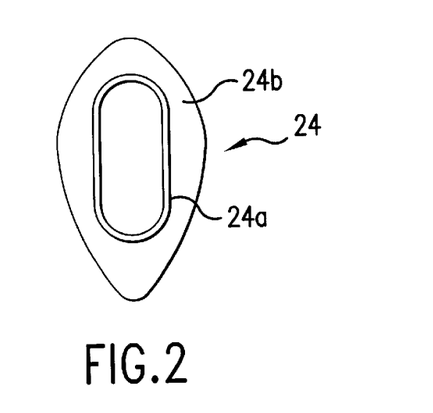
FIG. 2 is a front view of a fixing member.

FIG. 2 is a view of the fixing member 24 as seen from the bulb container 6 side. The flange 24b of the fixing member 24 has a wing-shaped cross-section which is similar in shape to the cross-section of the stay (see FIG. 3).

Figure 3:
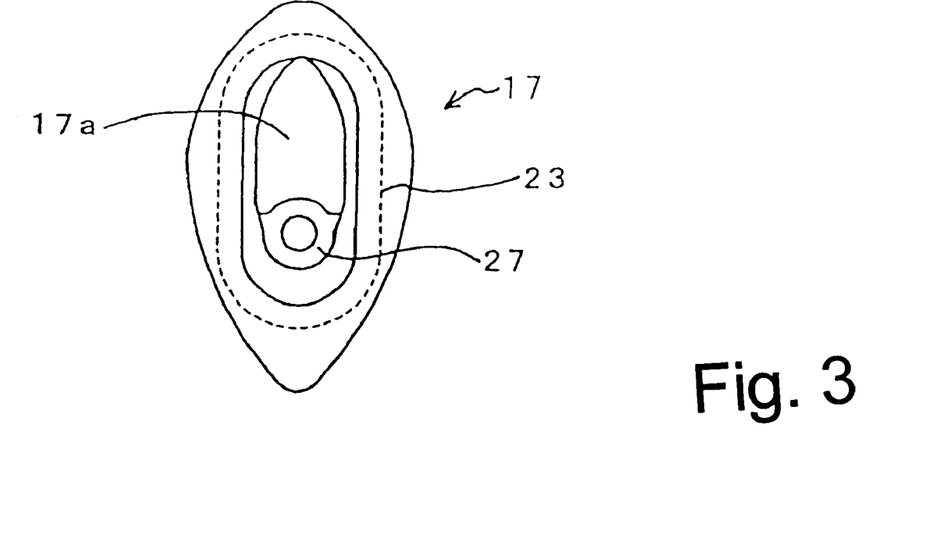
FIG. 3 is a view of a stay seen from the vehicle body mounting side.

FIG. 3 is a view of the stay 17 as seen from the vehicle body 18 side. The stay 17 has a wing-shaped cross-section, and has a hollowed portion or through-hole 17a having a space which is large enough to allow the cords 16 to pass through.

A spacer 27 is formed in the stay 17 and is offset from the edge of the hollowed portion 17a. When the stay 17 is fixed to the base 4, the spacer 27 is held between the lock screw 21 and the boss 20 and functions as a washer. The dotted line shows the outer shape of the groove 23.

Figure 4:
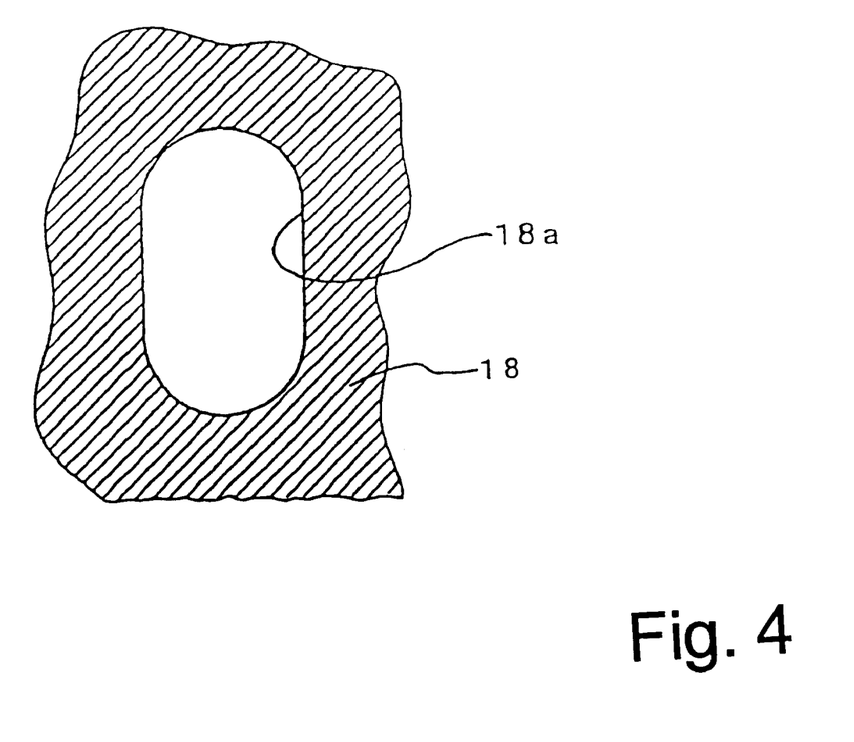
FIG. 4 is a view showing a mounting hole formed in a mounting member of a vehicle body.

FIG. 4 is a view of the bulb container mounting hole 18a. The bulb container mounting hole 18a is fitted to the groove 23 (see FIG. 3).

Figure 5:
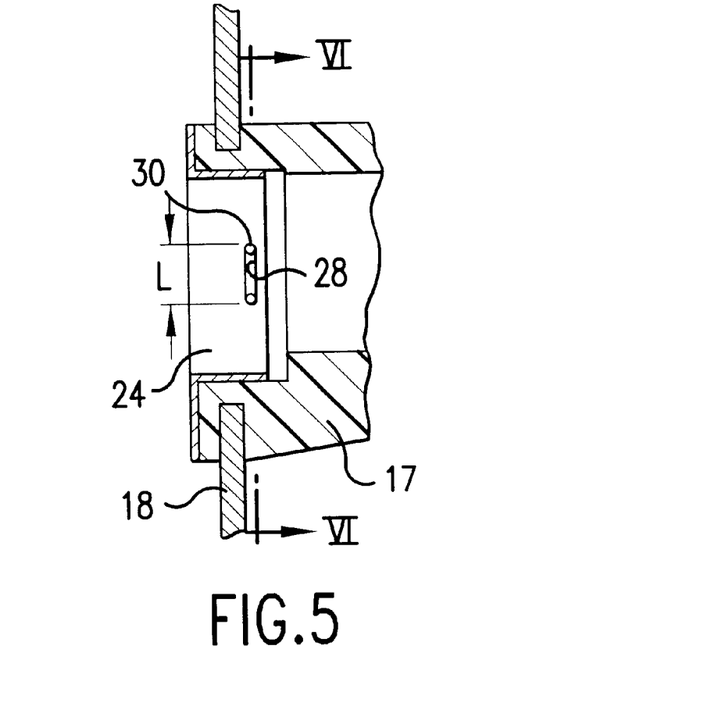
FIG. 5 is a sectional view of a first variant of the fixing member.

FIG. 5 is a sectional view of a variant of the fixing member 24 in which the fixing member 24 is locked to the stay 17 by a pin 30. The stay 17 may be made from an elastic material such as rubber. A pin locking hole 28 is formed in the fixing member 24 which is inserted into the end portion of the stay 17, and two pin guide holes 29 are formed in the stay 17. Two legs of a pin 30 are inserted from the outer surface of the stay 17 into the pin guide holes 29. Recesses of bent portions of the legs of the pin 30 are locked with the pin locking hole 28 of the fixing member 24.

A length L of the pin locking hole 28 is slightly less than a span S between the two legs of the pin 30. Accordingly, the span S is narrower when it is engaged with the pin locking hole 28 than when it is in its free state. As a result, the legs of the pin 30 are pressed to the wall of the pin locking hole 28 by the resiliency of the stay 17, so that the pin 30 is securely held.

Figure 6:
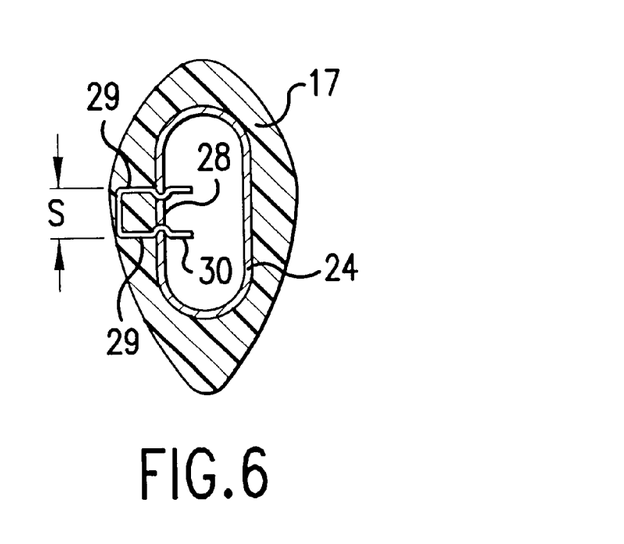
FIG. 6 is a view seen from line VI—VI in FIG. 5.

FIG. 6 is a view seen from line VI—VI in FIG. 5. The recesses of the bent portions of the legs of the pin 30 are located on the outer side of the pin 30. However, the pin 30 may be formed such that the recesses are positioned on the inner side of the pin 30, that is, projections may extend from the outer side of the pin 30. In this case, the length L of the pin locking hole 28 is set to be identical to the span S of the pin 30, and the projections are locked in the pin locking hole 28.

Figure 7:
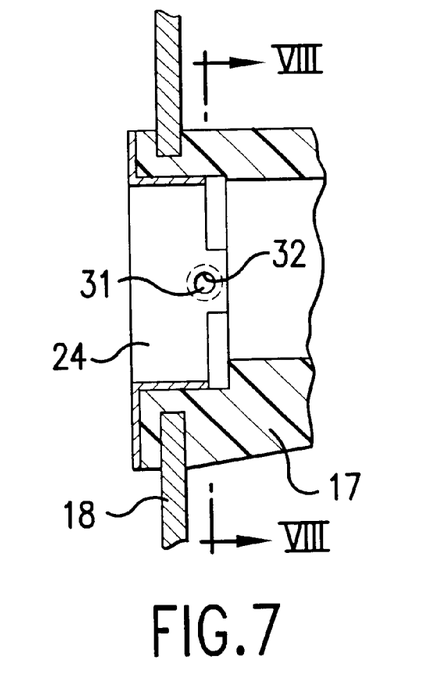
FIG. 7 is a sectional view of a second variant of the fixing member.
Figure 8:
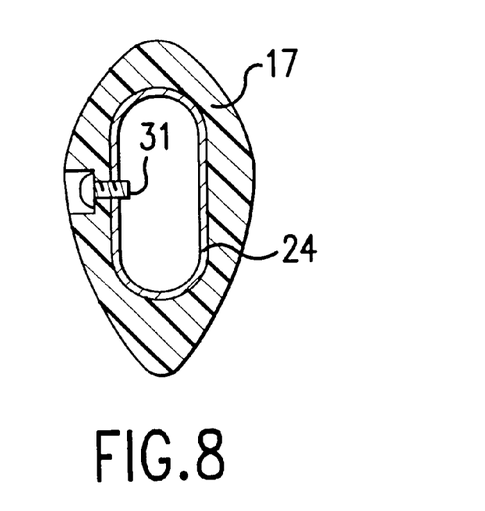
FIG. 8 is a view seen from line VIII—VIII in FIG. 7.

FIG. 7 is a sectional view of a second variant of the fixing member 24. In FIG. 7, the fixing member 24 is locked on the stay 17 with a screw. The fixing member 24 has a hole 32 to which a tapping screw 31 is fitted, and the stay 17 has a guide hole 33 for guiding the tapping screw 31. In this configuration, the fixing member 24 is fixed on the stay 17 with the tapping screw 31.

Figure 15:
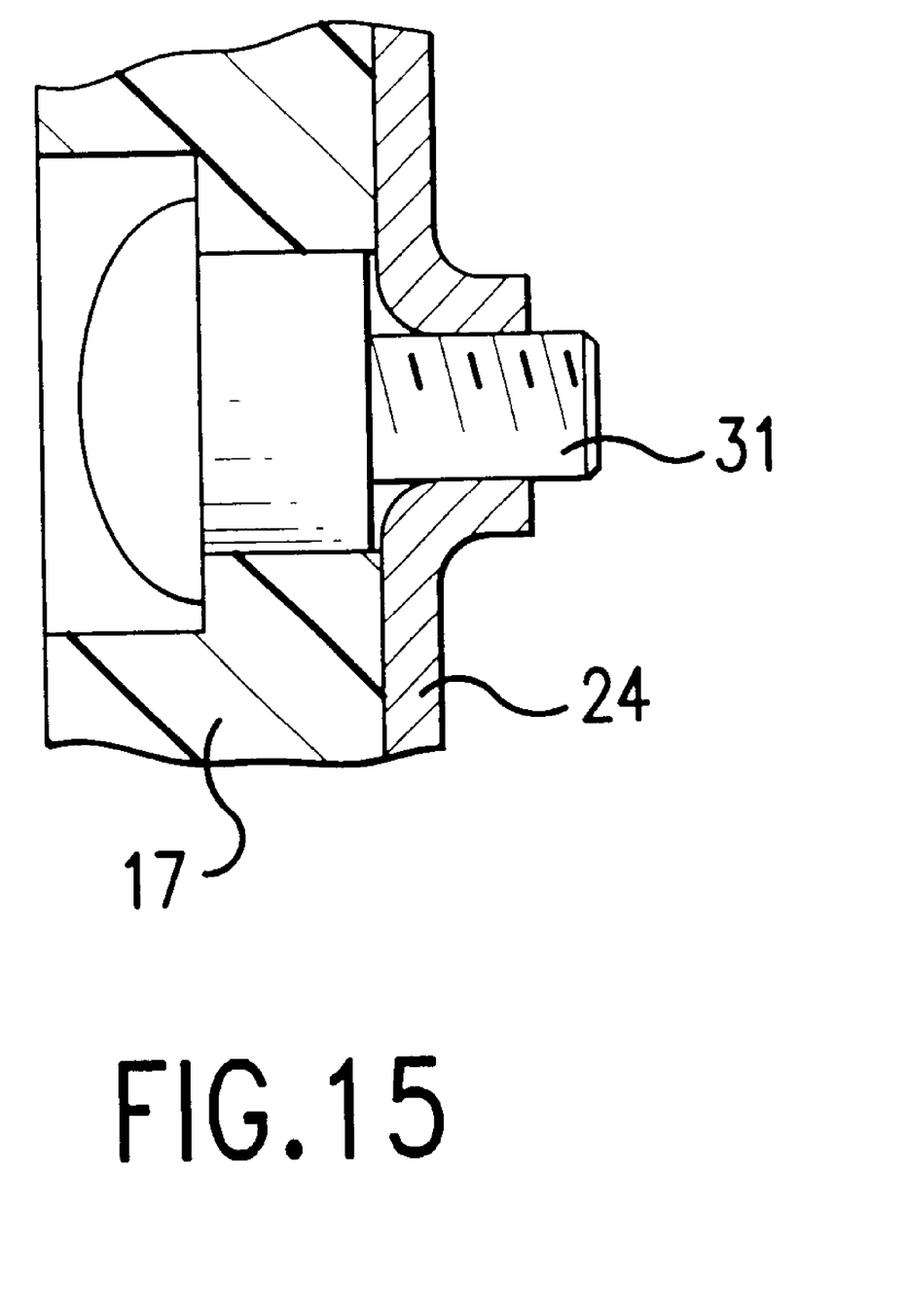
FIG. 15 is a sectional view of a fourth variant of the fixing member.

The fixing member 24 may be fixed to the stay 17 with a stepped screw instead of the tapping screw 31. For example, as shown in FIG. 15, the fixing member 24 is subjected to burring, and a female thread is formed in the burred portion. Then, a stepped screw 31a is screwed in the female thread portion, to fix the fixing member 24 to the stay 17.

Although each of the above-described two variations requires a additional step for inserting the pin, or fastening the tapping screw, this step can be carried out by using a readily available tool such as a screwdriver. The variants are advantageous in that the fixing member 24 can be more securely fixed to the stay 17.

In the disclosed embodiments, the stay 17 has a wing-shaped cross-section, however, the present invention is not limited thereto. For example, the stay 17 may have a either a circular or rectangular cross-section. If the stay 17 has a circular cross-section, a means for preventing the rotation of the stay 17 relative to the vehicle body should be provided. For example, a projection may be provided in the groove 23 of the stay 17 to be engaged with the vehicle body 18, and a recess corresponding to the projection may be provided in the vehicle body 18.

In this embodiment, the fixing member 24 is fixed to the stay 17 by engaging the cylindrical portion of the fixing member 24 in the stay 17. The fixing member 24 may alternatively be fixed on the stay 17 by securing the flange 24b to the stay 17.

Figure 11:
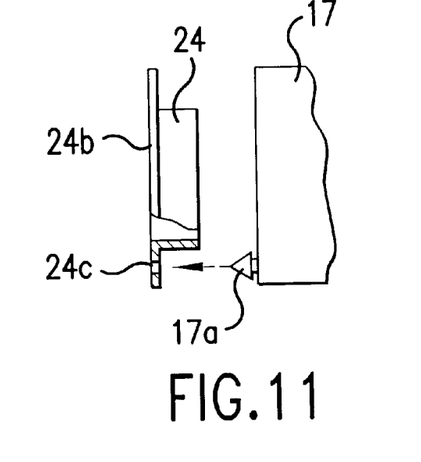
FIG. 11 is a sectional view of a third variant of the fixing member.

FIG. 11 is a view of a third variant of the fixing member 24. In FIG. 11, flange 24b is secured to the stay 17. An engagement hole 24c is formed in the flange 24b of the fixing member 24, and a projection 17a is provided on an end surface of the stay 17. The leading end of the projection 17a has a head whose diameter is slightly larger than the diameter of the engagement hole 24c. When the end portion of the projection 17a is inserted into the engagement hole 24c, the fixing member 24 is securely held to the stay 17 by the projection 17a engaged with the hole 24c.

According to the present invention, the bulb container is mounted such that an outer peripheral groove is engaged with the mounting hole of the vehicle body. Accordingly, it is possible to simplify the insert-molding of the mounting metal fixture. Further, since the stay is fixed to the vehicle body side without the use of bolts and nuts, the inward projection of nuts into the vehicle body can be eliminated.

Since the stay is sufficient to have a wall thickness for ensuring the necessary strength of the stay, the though hole formed in the stay can be made large, and accordingly the diameter of the mounting hole on the vehicle body can be made large. This makes it possible to relieve the stress concentration and to easily fasten the screw provided in the through-hole and allow the cords to easily pass through the through-hole.

Because the contact portion between the stay and the mounting hole on the vehicular side can be reinforced by the flange or the cylindrical portion of the fixing member, it is possible to ensure a more stable mounting of the stay.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting device for a vehicle having a mounting member, the device comprising:
    a bulb container;
    a stay for mounting the bulb container to the mounting member, the stay having a groove, and being connected to the bulb container, wherein the groove is engageable with a peripheral edge of the mounting member; and
    a fixing member, the fixing member having a cylindrical portion and a flange extending radially from the cylindrical portion, the cylindrical portion of the fixing member extending into a through hole of the stay.

2. The lighting device of claim 1, wherein the stay has the shape of a hollow cylinder.

3. The lighting device of claim 1, wherein the stay has a cross-section of a rectangle or circle.

4. The lighting device of claim 1, wherein the stay has a cross-section of a wing shape.

5. The lighting device of claim 1, wherein
    the groove is disposed about a periphery of a first end of the stay; and
    the bulb container is connected to a second end of the stay.

6. The lighting device of claim 5, wherein the bulb container includes:
    a base;
    a bulb supported on the base; and
    a lens disposed opposite the bulb and connected to the base; wherein
    the base contacts the second end of the stay.

7. The lighting device of claim 5, wherein the stay includes a through hole extending from the first end to the second end of the stay.

8. The lighting device of claim 7, wherein the stay includes a mounting plate, the mounting plate extending across the through hole, and having an aperture for the passage of conductors.

9. The lighting device of claim 8, further comprising:
    a lock screw, the lock screw extending through the mounting plate and into a boss of the bulb container.

10. A lighting device for a vehicle having a mounting member, the device comprising:
    a bulb container;
    a stay for mounting the bulb container to the mounting member, the stay having a groove, and being connected to the bulb container; wherein the groove is engageable with a peripheral edge of the mounting member;
    a fixing member, the fixing member having a cylindrical portion and a flange extending radially from the cylindrical portion, the cylindrical portion of the fixing member extending into a through hole of the stay; and a pin extending through a portion of the stay and through a pin locking hole in the fixing member.

11. The lighting device of claim 1, wherein the stay is made from an elastic material.

* * * * *